(12) United States Patent
Peters

(10) Patent No.: US 6,296,126 B1
(45) Date of Patent: Oct. 2, 2001

(54) DEVICE FOR REMOVING A LIQUID FROM CAPILLARIES

(75) Inventor: Ralph-Peter Peters, Bergisch Gladbach (DE)

(73) Assignee: Microparts Gesellschaft, Dortmund (DE)

( * ) Notice: Subject to any disclaimer, the term of this patent is extended or adjusted under 35 U.S.C. 154(b) by 0 days.

(21) Appl. No.: 09/469,243

(22) Filed: Dec. 22, 1999

(30) Foreign Application Priority Data

Dec. 23, 1998 (DE) .............................. 198 59 693

(51) Int. Cl.[7] ................................... B01D 24/42
(52) U.S. Cl. .................... 210/456; 210/232; 210/473
(58) Field of Search .................... 210/232, 455, 210/456, 473; 422/104

(56) References Cited

FOREIGN PATENT DOCUMENTS

| | | |
|---|---|---|
| 198 10 499 | 9/1999 | (DE) . |
| 0 336 483 | 10/1989 | (EP) . |
| 0 348 006 | 12/1989 | (EP) . |
| WO 99 46045 | 9/1999 | (WO) . |

*Primary Examiner*—John Kim
(74) *Attorney, Agent, or Firm*—Oblon, Spivak, McClelland, Maier & Neustadt, P.C.

(57) ABSTRACT

Liquid components are separated from a liquid using separation devices, such as filters and membranes, in which capillary forces, which retain the liquid component to be separated in the separation device, are effective. If the amount of liquid is very small, it can be very difficult to remove the liquid component to be separated in the separation device in a free and unchanged form. This process step is simplified or facilitated by a wedge-shaped cut-out at an exit end of the capillary or in a columnar body which is in contact with an exit end of the capillary. A radius of curvature of a wedge edge is smaller than a radius of the capillary. A base side of the wedge-shaped cut-out is adjacent to a collecting chamber in which the separated-off liquid component is collected, and in which the capillary forces are smaller than interfering forces in the capillary itself. If interfering capillary forces are still effective in the collecting chamber, then a further wedge-shaped cut-out can be provided at the exit end of the collecting chamber. Thus, the device makes it possible to separate off liquid components in the microliter range.

19 Claims, 6 Drawing Sheets

DEVICE FOR REMOVING A LIQUID FROM CAPILLARIES

CROSS-REFERENCE TO RELATED APPLICATION

This application corresponds to German Patent Application Serial No. 198 59 693.6 filed on Dec. 23, 1998. The contents thereof are incorporated herein.

BACKGROUND OF THE INVENTION

1. Field of the Invention

The invention relates to a device for removing a wetting liquid from one or more capillaries. The purpose of the invention is to simplify the removal of a liquid from capillaries or to enable the liquid to be obtained as a free-flowing liquid.

2. Description of Related Art

Capillaries are narrow spatial structures in which surface effects of liquids occur. They can have any cross-sectional shape, including tubes and gaps. The dimensions of the cross section are in the millimeter to sub-micron region in at least one direction. The capillaries can have any desired spatial course.

Capillaries can exist as discrete structures in the form of individual straight or bent tubes having a relatively thin wall, or they can be in the form of a tube passing through a body. Furthermore, they can be pores in an open-pore porous body or sintered body or in the form of spaces between closely packed fibers in the form of paper, nonwovens or felt. They can furthermore have the shape of narrow gaps.

The surface of a wetting liquid adjoining a solid wall forms a contact angle from zero degrees to less than ninety degrees with the wall. In other words, wetting liquids have a contact angle which is greater than zero. Owing to their surface tension, wetting liquids are drawn into capillaries until the latter are completely filled. If a small force acts on the liquid at the exit end of the capillaries, the surface tension can hold the liquid in the capillaries and prevent it from exiting. The liquid can be forced to exit from the end of the capillaries by a sufficiently large pressure difference in the liquid between the capillary entrance and the capillary exit.

European Patent No. 336,483 discloses a device for separating an initially introduced liquid. The device consists of a first open-pore membrane (separator membrane) and a second open-pore membrane (collector membrane). The collector membrane is directly adjacent to the side of the separator membrane. The part of the liquid introduced on the one side of the separator membrane and which has passed through the separator membrane enters the collector membrane where it remains. The liquid collected in the collector membrane below the separator membrane can be reacted with a reagent applied to the collector membrane or the collected liquid can be washed out of the collector membrane by a further liquid and subsequently analyzed. The liquid separated therefrom by the separator membrane and collected in the collector membrane can thus remain in the collector membrane during its further analysis or it can be washed out, in which case it is mixed with a further liquid. In either case, there is not obtained a free-flowing liquid that consists of only the part of the initially introduced liquid which has been separated therefrom by the separator membrane.

For the analysis or use of liquids which have been collected with the aid of capillaries or separated from a liquid medium, it may be advantageous or necessary to obtain the liquid from the capillaries as a free-flowing liquid which is not mixed with any further liquid.

BRIEF SUMMARY OF THE INVENTION

A primary object of the invention is to provide a device by which the liquid can be removed from one or more capillaries and collected in a collecting chamber as a free-flowing liquid. In a sufficiently large collecting chamber, surface effects are virtually no longer effective.

This object is achieved in accordance with the invention by a device having the following characterizing features:

in each case, a wedge-shaped cut-out in a body at the exit end into which at least one capillary runs;

a radius of curvature of the wedge edge of the cut-out which radius is smaller than half the smallest dimension of the largest capillary which runs into the wedge-shaped cut-out; and a wedge angle of less than 150 degrees between the wedge surfaces of the cut-out in the vicinity of the wedge edge;

wherein the collecting chamber is adjacent to the base side of the wedge-shaped cut-out.

The wedge-shaped cut-out has a wedge edge and a base side. The radius of curvature of the wedge edge is smaller than the radius of curvature of a capillary having a circular cross section. In the case of capillaries having any desired cross section but with dimensions that are in the same order of magnitude in two mutually perpendicular directions, the radius of curvature of the wedge edge is smaller than the equivalent radius of the noncircular capillary. The equivalent radius of a capillary having a noncircular cross section is the radius of a circle whose area is identical to the area of the noncircular cross section of the capillary. In the case of capillaries which are in the form of pores in an open-pore body, the cross-sectional area of the capillaries is distributed over the region of the cross section. In this case, the radius of curvature of the wedge edge is smaller than half the smallest dimension of the capillary having the largest cross section. In the case of slot-shaped capillaries, the radius of curvature of the wedge edge is smaller than half the thickness of the slot.

The wedge edge is adjacent to the two wedge surfaces of the cut-out. These two wedge surfaces form a wedge angle of less than 150 degrees, preferably less than ninety degrees, with one another. The wedge surfaces of the cut-out can be rounded off in a convex manner in the region of the base side.

The device according to the invention can be in the form of a one-piece body or can be composed of two parts. In the two-piece device, at least one capillary is located in the first body. The second body consists of a base plate which is provided on one side with preferably a plurality of projections. At least one wedge-shaped cut-out is present in at least one of these projections. A projection can be provided with a plurality of wedge-shaped cut-outs, each of which is assigned to at least one capillary. The free end of at least one projection is in contact with the surface of the first body, in which the exit end of at least one capillary is located. The beginning of the wedge edge of the wedge-shaped cut-out is inside the exit area of the capillary. Any small separation which may be present between the first body and the free end of the projections of the second body has no effect on the action of the device according to the invention as long as the liquid present at the exit ends of the capillaries in the first body is in contact with the free end of a projection of the second body.

Furthermore, a collecting chamber is provided in the vicinity of the wedge-shaped cut-outs provided in the projections. This collecting chamber is essentially limited by the side of the base plate on which the projections are provided and by the side of the first body in which the exit areas of the capillaries are located.

In the two-piece device, the first body can contain a single capillary or a plurality of individual capillaries. The second body can furthermore be an open-pore membrane or an open-pore sintered body, or it can consist of fibers, such as nonwoven, felt or paper, for example blotting paper. Bodies of this type preferably have a planar exit side. In the latter case, it is sufficient to bring the free ends of projections containing at least one wedge-shaped cut-out into contact with the exit side of the open pores in the first body. Owing to the multiplicity of randomly distributed pores which are generally interconnected within a body of this type, the position of the beginning of the wedge edge at the free end of the projections can be selected virtually freely as long as a sufficiently large number of wedge-shaped cutouts is present.

In the two-piece device according to the invention, the wedge edge of the wedge-shaped cut-outs, which are present in the projections on one side of the second body, can be perpendicular to the side of the first body in which the exit ends of the capillaries are located, i.e. the angle between the wedge edge and the side of the first body is equal to ninety degrees, or is inclined to this side surface by an angle of at least twenty degrees.

The projections can have the shape of columns, cones, pyramids or cross pieces arranged in an island-like manner. The cross pieces can be straight or curved and can be provided on one or both sides with wedge-shaped cut-outs.

The one-piece device contains at least one capillary and a collecting chamber into which the capillary runs. At the exit side of the capillary, a wedge-shaped cut-out is present in the wall of the collecting chamber. The beginning of the wedge edge of the wedge-shaped cut-out starts in the wall of the capillary in the vicinity of its exit end.

If surface effects and capillary forces are effective in the collecting chamber in which the liquid removed from the capillaries is initially collected, the device according to the invention, which consists of at least one capillary, at least one wedge-shaped cut-out and at least one collecting chamber, can have a number of wedge-shaped cut-outs and collecting chambers arranged one after the other until virtually no surface effects are effective in the last of a plurality of collecting chambers. In the case of a plurality of collecting chambers arranged one after the other in regard to the flow direction of the liquid, the capillarity-determining dimensions of the second collecting chamber are larger than the capillarity-determining dimensions of the first collecting chamber, and the capillarity-determining dimensions of the third collecting chamber are larger than the capillarity-determining dimensions of the second collecting chamber.

The action of the device according to the invention is based on the suction action of the wedge-shaped cut-outs having the stated dimensions and in the stated arrangement on wetting liquids which are present at the wedge-shaped cut-outs, and on the reduction of surface effects in the collecting chamber. The surface effects in the collecting chamber are reduced, if necessary, to an insignificant level by a multiple arrangement of the device according to the invention.

The device according to the invention is effective continuously as long as liquid is present at the beginning of the wedge edge and the collecting chamber is covered only on its base with a liquid layer in the vicinity of the wedge-shaped cut-outs and no liquid is present above this level up to the height of the beginning of the wedge edge of the wedge-shaped cut-out.

The device according to the invention has several advantages.

When the device is used, a free-flowing liquid is obtained and is located in a collecting chamber. It is not held in a collector membrane.

The free-flowing liquid is not mixed with another liquid.

It enables the collection of a free-flowing liquid down into the microliter region.

It is effective independently of gravity and the wedge edge can have any desired spatial direction.

The device according to the invention can consist of plastic, for example polymethyl methacrylate (PMMA), polycarbonate (PC), polystyrene (PS) and the like or metal, for example nickel, copper, cobalt, steel and alloys thereof, or a semiconductor material, for example silicon or germanium.

The geometrical microstructures can be produced, for example, by deep X-ray lithography, UV lithography, fine-mechanical precision machining, laser treatment, dry etching or wet etching.

They can initially be produced in a plastic and conveyed into a complementary metal structure by electrodeposition of metal. This complementary structure can be used as a mold insert by which many of the desired plastic microstructures are cast with the aid of injection molding.

Furthermore, a microstructure which is complementary to the desired microstructure can be produced in plastic from which the desired metallic microstructure is cast by electrodeposition of metal.

The device according to the invention can be used, inter alia, for separating a liquid from a solid-containing medium by a filter membrane, for separating blood plasma from whole blood by a separator membrane, or for filling the wells of a microtiter plate via a feed capillary.

BRIEF DESCRIPTION OF THE DRAWINGS

The device according to the invention is explained in greater detail with reference to the Figures.

DETAILED DESCRIPTION OF THE INVENTION

Figure 1A:
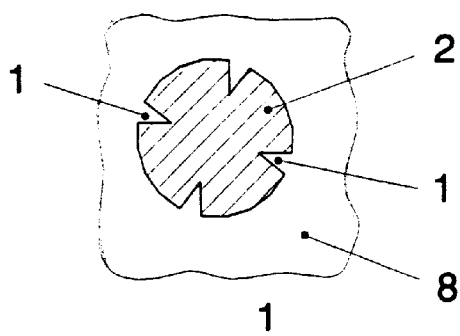
FIGS. 1a to 4 relate to a two-piece device composed of two bodies.
Figure 1B:
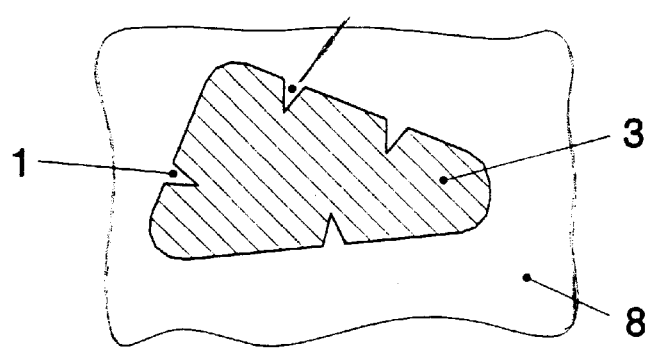
Figure 1C:
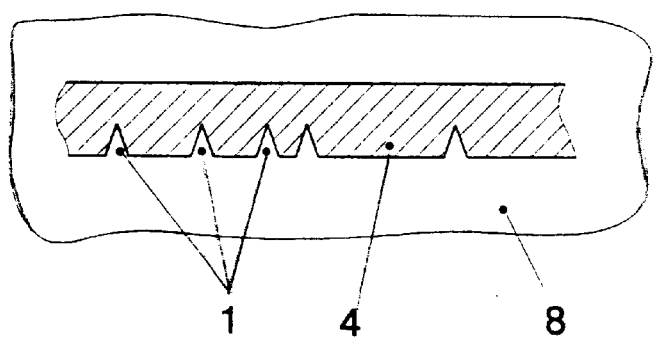

FIG. 1a shows a columnar projection 2 having a circular cross section and four wedge-shaped cut-outs 1 on a base plate 8. FIG. 1b shows a columnar projection 3 having an irregular triangular cross section and four wedge-shaped cut-outs 1 on the base plate 8. FIG. 1c shows a section of a projection 4 in the form of a cross piece with a plurality of wedge-shaped cut-outs 1 on one side thereof. The projection 4 rests on the base plate 8.

Figures 2A, 2B:
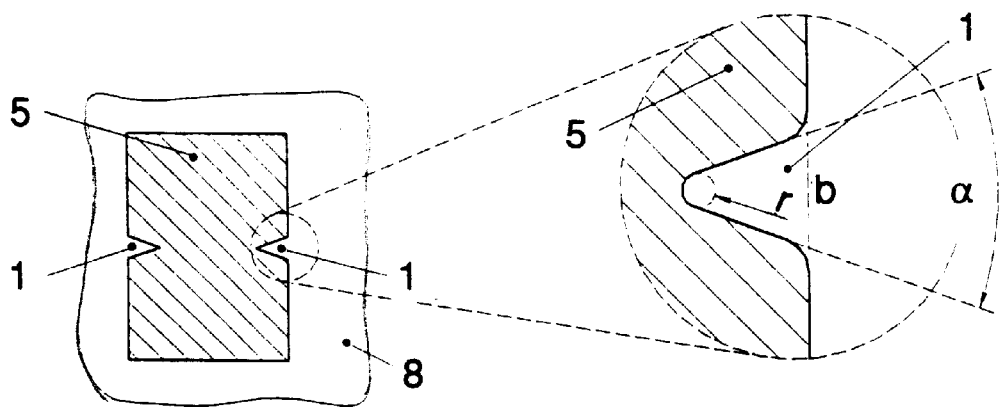

FIG. 2a shows a columnar projection 5 having a rectangular cross section and two wedge-shaped cut-outs 1. The projection 5 rests on the base plate 8. FIG. 2b shows details of one of the wedge-shaped cut-outs 1 in the projection 5, more precisely, the radius of curvature (r) of the wedge edge, the wedge angle (a) between the wedge surfaces of the cut-outs 1, and the base side (b) of the wedge-shaped cut-out 1.

Figure 3A:
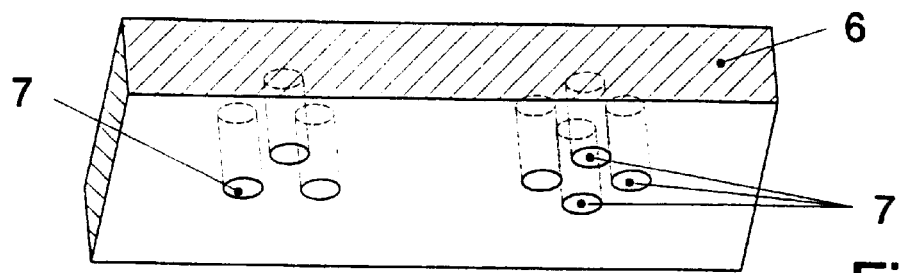
Figure 3B:
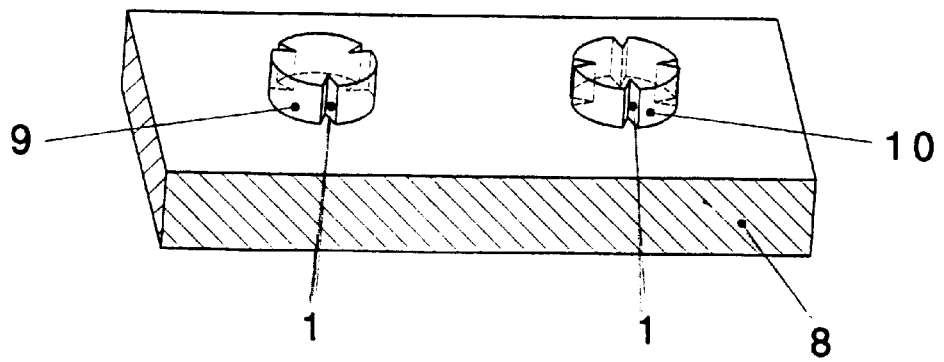

FIG. 3a shows a plate-shaped first body 6 having a plurality of capillaries 7. FIG. 3b shows a second body in the form of the base plate 8 having two columnar projections 9 and 10. The projection 9 carries three wedge-shaped cut-outs 1 in its cylinder surface while the projection 10 carries four wedge-shaped cut-outs 1. When the two bodies 6 and 8 are placed against one another, the free end of each wedge-shaped cut-out 1 in the projections 9 and 10 lies against the exit area of each one of the capillaries 7. The projection 9 is assigned to three capillaries while the projection 10 is assigned to four capillaries. The space which is defined by the upper side of the base plate 8 and the underside of the first body 6 and which is in the vicinity of the projections 9 and 10 is the collecting chamber which is adjacent to the base side of the wedge-shaped cut-outs 1.

Figure 4:
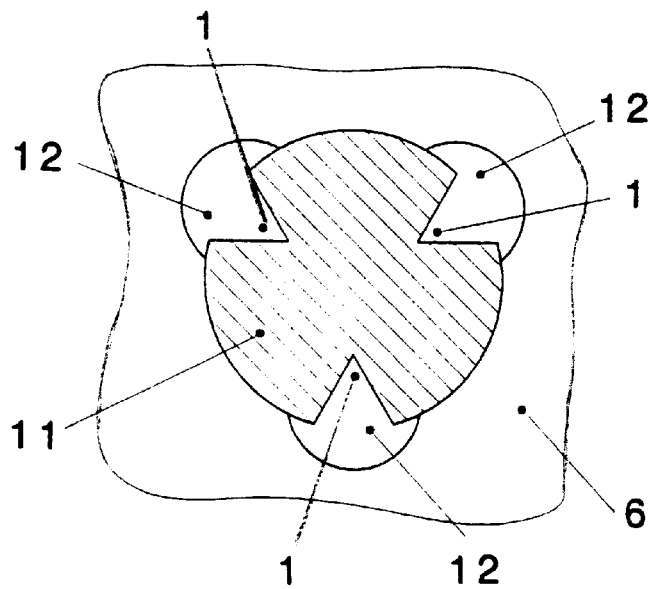

FIG. 4 shows a partial view of the underside of the first body 6 with the exit ends of three approximately circular capillaries 12. A columnar projection 11 shown in cross section has three wedge-shaped cut-outs 1, each of which is assigned to a capillary 12. The free end of the wedge edge of each wedge-shaped cut-out 1 is within the exit area of each capillary 12.

Figure 5:
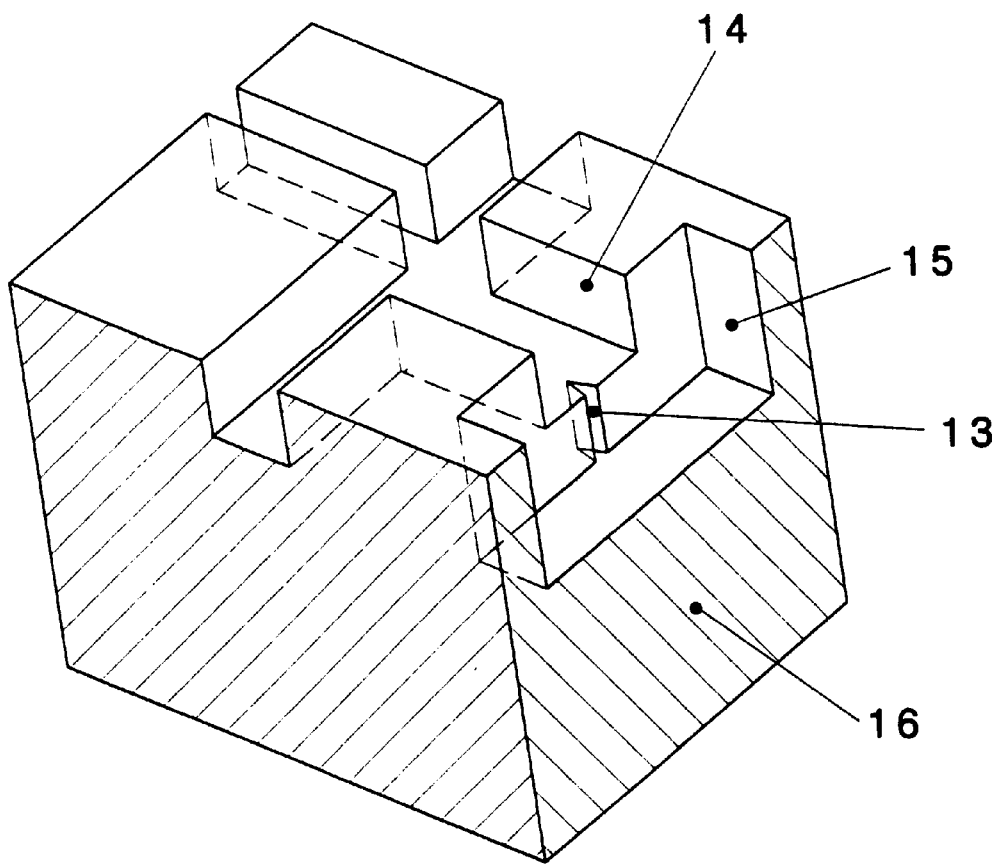
FIGS. 5 and 6 relate to a one-piece device.

FIG. 5 in combination with FIG. 2 shows a one-piece device in which the region of transition from a capillary into a relatively large collecting chamber is shown in an inclined view as a cut-off section. A capillary 14, a wedge-shaped cut-out 13, and a collecting chamber 15 having a rectangular cross section are arranged in a one-piece body 16. The wedge-shaped cut-out 13 is seamlessly adjacent to the exit end of the capillary 14 which has a rectangular cross section. The wedge edge of the wedge-shaped cut-out 13 is perpendicular to the wall of the capillary 14 and extends down to the base surface of the collecting chamber 15. In the device shown in FIG. 5, a cover plate (not shown) is, if desired, present on the upper side of the one-piece body 16.

Figure 6:
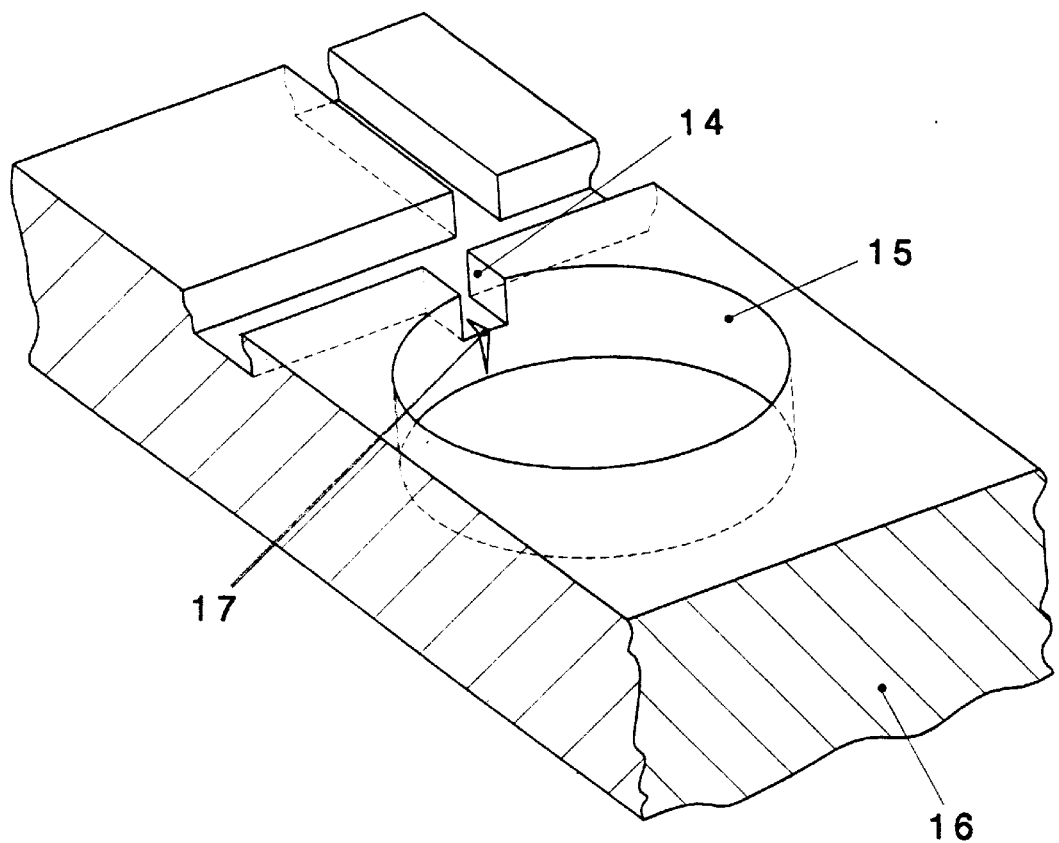

FIG. 6 shows a further form of a one-piece device in an inclined view. A capillary 14, a wedge-shaped cut-out 17, and the collecting chamber 15 having a circular cross section are arranged in the one-piece body 16. The wedge-shaped cut-out 17 is seamlessly adjacent to the exit end of the capillary 14 which has a rectangular cross section. The wedge edge of the wedge-shaped cut-out 17 is inclined with respect to the wall of the capillary 14 and hits the wall of the collecting chamber 15 above the base of this collecting chamber 15. In the device shown in FIG. 6, a cover plate (not shown) may be present on the upper side of the one-piece body 16.

Figure 7:
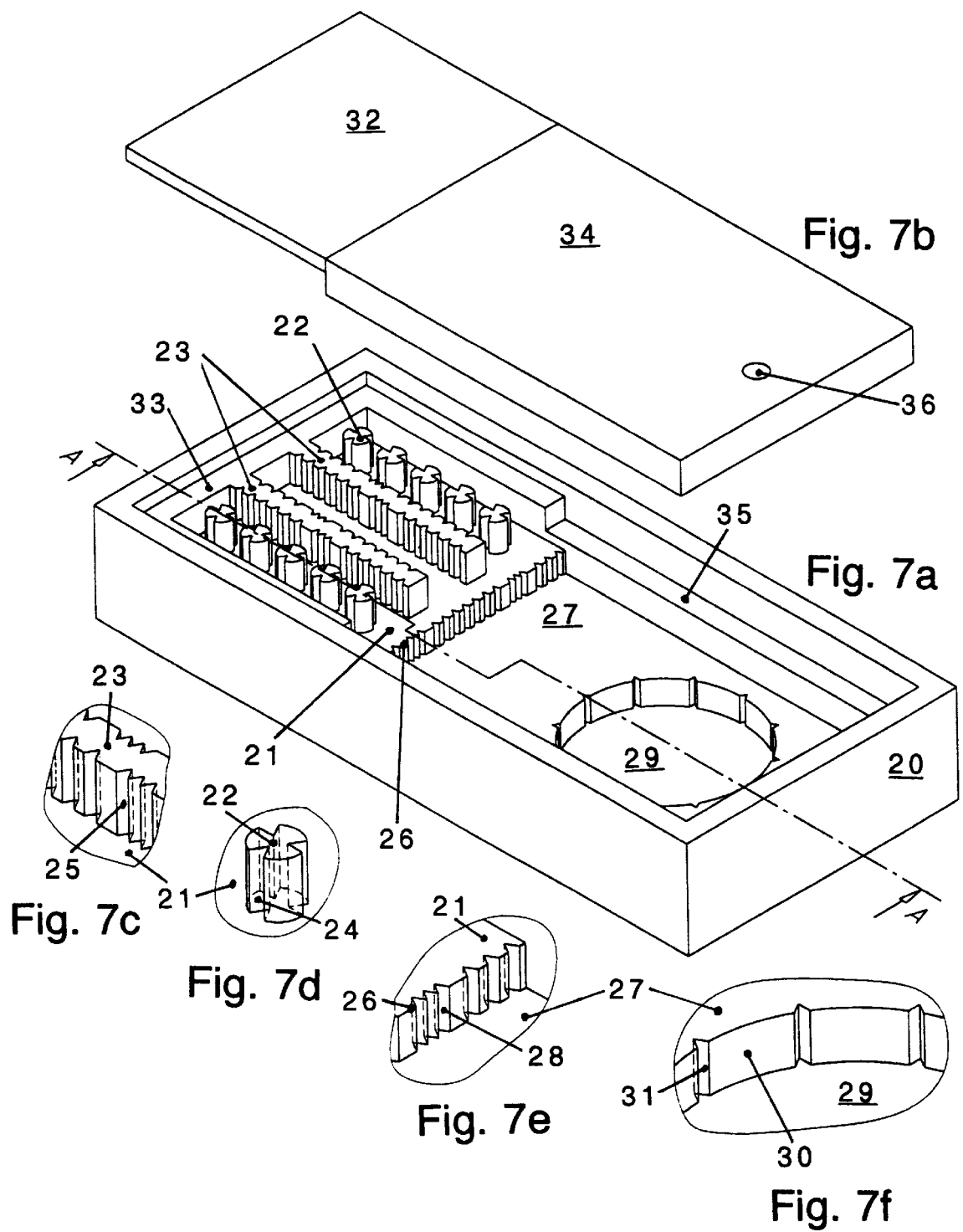
FIGS. 7a and 8 show a two-piece device in which three collecting chambers with the associated wedge-shaped cut-outs are arranged one after the other.

FIG. 7a shows a plate 20 on one side of which three devices according to the invention are shown. A plurality of primary columnar projections 22 and a plurality of secondary projections 23 in the form of cross pieces are provided on a base 21 of the first collecting chamber. Each of the columnar projections 22, one of which is shown enlarged in FIG. 7d, is provided with three wedge-shaped cut-outs 24 above the base 21. Each of the secondary projections 23 in the form of cross pieces, one of which is shown enlarged in FIG. 7c, is provided with a plurality of wedge-shaped cut-outs 25 above the base 21. The free volume between the columnar projections 22 and the secondary projections 23 in the form of cross pieces forms the volume of the first collecting chamber.

In FIG. 7a, an edge 26 of the base 21 of the first collecting chamber is adjacent to the second collecting chamber with a base 27. In FIG. 7e, a plurality of wedge-shaped cut-outs 28, some of which are shown enlarged, is provided in the edge 26 of the base 21 at the end of the first collecting chamber. The cut-outs 28 extend from the base 21 of the first collecting chamber to the base 27 of the second collecting chamber. The free volume above the base 27 forms the volume of the second collecting chamber.

In FIG. 7a, the third collecting chamber in the form of a circular recess with a base 29 is provided in the base 27 of the second collecting chamber. In FIG. 7f, an edge 30 of this recess is provided with a plurality of wedge-shaped cut-outs 31, some of which are shown enlarged. The wedge-shaped cut-outs 31 extend from the base 27 of the second collecting chamber to the base 29 of the third collecting chamber. The free volume above the base 29 forms the volume of the third collecting chamber.

FIG. 7b shows a top for the collecting chambers. A first cover 32 for the first collecting chamber is a separator membrane provided with capillaries whose underside is supported on top ends of the columnar projections 22 and on longitudinal sides of the secondary projections 23 as well as on an edge 33 of the plate 20. The cover 32 defines the first collecting chamber to the top. The liquid to be separated is applied to this separator membrane. A second cover 34 is a plate with an underside supported on an edge 35 and which defines the second and third collecting chambers to the top. A vent opening 36, through which air from the collecting chambers escapes as soon as liquid removed from the separator membrane enters the collecting chambers, is provided in the second cover 34. The removed liquid is present in a defined layer with a sufficient thickness, as advantageous or as necessary, for example, for optical analysis, between the underside of the cover 34 and the base 29 of the third collecting chamber. For optical analyses in transmitted light, the plate 20 consists of transparent material.

Figure 8:
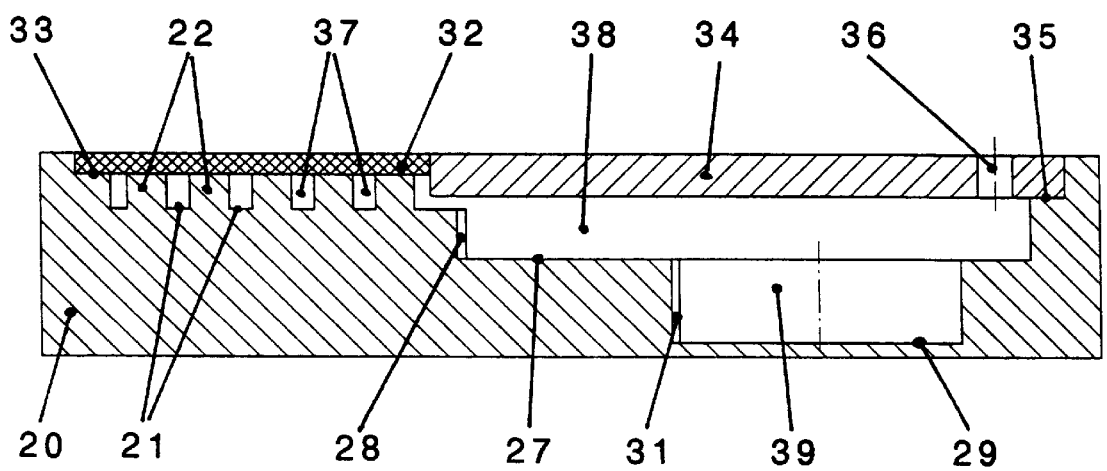

FIG. 8 shows a cross section through FIG. 7a along line A—A, showing the plate 20 with the columnar projections 22, the base 21 of a first collecting chamber 37, the base 27 of a second collecting chamber 38, and the base 29 of a third collecting chamber 39. Wedge-shaped cut-outs 28 are provided at the edge of the second collecting chamber 38 while wedge-shaped cut-outs 31 are provided at the edge of the third collecting chamber 39.

The first collecting chamber 37 lies between the columnar projections 22, the base 21 and the underside of the separator membrane cover 32 which rests on the edge 33. The second collecting chamber 38 lies between the base 27 and the underside of the plate cover 34 which rests on the edge 35. The third collecting chamber 39 lies between the base 29 and the underside of the same cover 34 with the vent opening 36 therethrough.

The capillarity of the collecting chambers 37, 38 and 39, shown in FIG. 8, is determined by their height, i.e. their separation between the underside of the covers 32 and 34 and the bases 21, 27 and 29 of the respective collecting chambers 37, 38 and 39. The height of the second collecting chamber 38 is greater than the height of the first collecting chamber 37. The height of the third collecting chamber 39 is greater than the height of the second collecting chamber 38.

FIG. 7a shows two forms of projections, namely columns 22 and cross pieces 23, in the first collecting chamber. By contrast, it is possible for the first collecting chamber to contain only columnar projections 22 in virtually any desired spatial arrangement or only secondary projections 23 in the form of cross pieces.

The wedge-shaped cut-outs 24, 25, 28 and 31 can be directly adjacent to one another in a sawtooth arrangement or they can be provided at a separation from one another. Both variants are shown in FIGS. 7a, 7c, 7d, 7e and 7f.

EXAMPLE 1

Filling of a Microchamber

Two circular chambers with a diameter of one millimeter and a depth of 500 micrometers ($\mu$m) are formed by deep X-ray lithography in a PMMA plate with a thickness of about 1.5 millimeters. A channel which connects the two chambers runs between the two chambers. The channel has a width of 100 $\mu$m, a depth of 100 $\mu$m and a length of about 5 millimeters. A wedge-shaped cut-out which extends as far as the base of the chamber is provided at the mouth of the channel in one of the two chambers. See FIG. 5. The wedge-shaped cut-out has a wedge height of 100 $\mu$m; its base side has a length of fifty $\mu$m; and the radius of curvature of the wedge edge is one $\mu$m. No wedge-shaped cut-out is provided at the mouth of the channel in the other chamber.

If the channel between the two chambers is filled with a drop of a liquid, for example ink, this liquid only runs into the chamber in which a wedge-shaped cut-out is provided at the mouth of the channel. The other chamber, in which no wedge-shaped cut-out is provided at the mouth of the channel, remains unwetted.

EXAMPLE 2

Device for Separating Blood Plasma from Whole Blood

A glass-fiber/cellulose membrane is laid on a PMMA plate with a thickness of about 1.5 millimeters. The plate has been produced by injection molding. The plate is provided with cross pieces on its upper side. See FIG. 1c. The cross pieces have a width of 500 $\mu$m, a height of 120 $\mu$m, and a separation of 400 $\mu$m from one another. Wedge-shaped cut-outs which extend 300 $\mu$m into the cross piece and have a wedge angle of 25 degrees are provided on a longitudinal side of each cross piece. The radius of curvature of the wedge edge is two $\mu$m. The separation of the cut-outs from one another is 600 $\mu$m. A channel with a width of 400 $\mu$m and a depth of 120 $\mu$m is located between each two cross pieces between the underside of the membrane and the upper side of the plate. All channels taken together form the collecting chamber. The volume of the collecting chamber is 5.4 microliters per square centimeter of plate area.

If whole blood is dribbled onto the membrane, the blood cells are separated from the blood plasma in the membrane. Because of the presence of the wedge-shaped cut-outs at the sides of the cross pieces, the blood plasma is transported out of the membrane into the collecting chamber where it is collected. The blood plasma remains in unchanged form, i.e. it is not mixed with another liquid, and can be used directly for subsequent analysis.

Numerous modifications and variations of the present invention are possible in light of the above teachings. Thus, it is to be understood that, within the scope of the appended claims, the invention may be practiced otherwise than as specifically described herein.

What is claimed is:

1. A device for removing a liquid from at least one capillary into a collecting chamber, wherein:
   in each case, there is a wedge-shaped cut-out in a body at an exit end into which the at least one capillary runs;
   a radius of curvature of a wedge edge of the cut-out is smaller than half the smallest dimension of the largest capillary which runs into the wedge-shaped cut-out;
   a wedge angle between wedge surfaces of the cut-out in a vicinity of the wedge edge is less than 150 degrees; and
   said collecting chamber is adjacent to a base side of the wedge-shaped cut-out.

2. A device according to claim 1, wherein:
   said wedge angle between the wedge surfaces of the cut-out in the vicinity of the wedge edge is less than ninety degrees.

3. A device according to claim 1 in a two-piece shape configured to remove a liquid from at least one capillary which passes through a first body into a second collecting chamber which is provided in a second body, wherein:
   said at least one wedge-shaped cut-out into which the at least one capillary runs at its exit end is provided in at least one projection which is located on a base plate as the second body;
   a free end of the at least one projection is in contact with a surface of the first body in which the exit end of the at least one capillary is located; and
   a beginning of the wedge edge of the wedge-shaped cut-out is within an exit area of the at least one capillary.

4. A device according to claim 3, wherein the at least one capillary is:
   a single capillary in the first body.

5. A device according to claim 3, wherein:
   said wedge edge of the wedge-shaped cut-out is perpendicular or inclined by an angle of at least twenty degrees to the surface of the first body in which the exit end of the at least one capillary is located.

6. A device according to claim 3, wherein:
   said at least one wedge-shaped cut-out is provided in at least one projection which has the shape of a column.

7. A device according to claim 1 in a one-piece shape, wherein:
   in each case, the wedge-shaped cut-out runs seamlessly into the at least one capillary at the exit end thereof.

8. A device according to claim 7, wherein:
   said wedge-shaped cut-out is provided in a wall of the collecting chamber into which the at least one capillary runs; and
   a beginning of the wedge edge of the wedge-shaped cut-out is located in a wall of the capillary in a vicinity of the exit end thereof.

9. A device according to claim 8, wherein:
   said wedge edge of the wedge-shaped cut-out is perpendicular or inclined to an angle of at least twenty degrees to the wall of the capillary.

10. A device according to claim 1, wherein:
    a plurality of groups, which each comprise at least one wedge-shaped cut-out and a collecting chamber, is arranged one after the other; and
    a dimension determining a capillarity of the collecting chamber is greater than a capillarity-determining dimension of a respective collecting chamber arranged therebefore.

11. A device according to claim 1, wherein said device is configured to separate a liquid from a liquid medium.

12. A device according to claim 11, wherein said device is configured for one of:
    separating the liquid from a solid-containing medium by a filter membrane;
    separating blood plasma from whole blood by a separator membrane; and
    filling a well of a microtiter plate from a feed capillary.

13. A device according to claim 3, wherein at least one capillary is:

a plurality of discrete capillaries or gaps passing through the first body.

14. A device according to claim 3, wherein at least one capillary is:

a plurality of pores or gaps in the first body which is an open-pore membrane.

15. A device according to claim 3, wherein the at least one capillary is:

an open-pore sintered body.

16. A device according to claim 3, wherein the at least one capillary is one of:

a nonwoven, a felt or a paper.

17. A device according to claim 3, wherein:

said at least one wedge-shaped cut-out is provided in at least one projection which has the shape of a cone.

18. A device according to claim 3, wherein:

said at least one wedge-shaped cut-out is provided in at least one projection which has the shape of a pyramid.

19. A device according to claim 3, wherein:

said at least one wedge-shaped cut-out is provided in at least one projection which has the shape of a cross piece.

* * * * *